United States Patent
Kropp et al.

(10) Patent No.: US 12,336,555 B2
(45) Date of Patent: Jun. 24, 2025

(54) METHOD AND SYSTEM FOR PURGING OFF-FLAVOR COMPOUNDS FROM FARM-RAISED FISH

(71) Applicant: Exciton Clean, LLC, Verona, WI (US)

(72) Inventors: Ramsey Kropp, Madison, WI (US); Terence P. Barry, Middleton, WI (US); David W. Kapsos, McFarland, WI (US)

(73) Assignee: Exciton Clean, LLC, Verona, WI (US)

( * ) Notice: Subject to any disclaimer, the term of this patent is extended or adjusted under 35 U.S.C. 154(b) by 722 days.

(21) Appl. No.: 17/536,448

(22) Filed: Nov. 29, 2021

(65) Prior Publication Data

US 2023/0165289 A1 Jun. 1, 2023

(51) Int. Cl.
*A23L 27/00* (2016.01)
*A01K 61/10* (2017.01)
*A23L 17/00* (2016.01)

(52) U.S. Cl.
CPC .............. *A23L 27/84* (2016.08); *A01K 61/10* (2017.01); *A23L 17/00* (2016.08)

(58) Field of Classification Search
CPC ......... A23L 27/84; A23L 17/00; A01K 61/10; A01K 63/04; A01K 63/042; Y02A 40/81; B01J 21/063; B01J 35/39; C02F 1/32; C02F 1/72; C02F 1/725; C02F 2305/023; C02F 2305/10
USPC .................................................... 210/748.13
See application file for complete search history.

(56) References Cited

U.S. PATENT DOCUMENTS

| | | | |
|---|---|---|---|
| 4,052,960 A * | 10/1977 | Birkbeck | A01K 61/00 |
| | | | 210/167.22 |
| 7,467,601 B2 | 12/2008 | Brauman | |
| 10,034,461 B2 | 7/2018 | Holm et al. | |
| 10,285,385 B2 | 5/2019 | Urup | |
| 10,660,315 B1 | 5/2020 | Alcantar et al. | |
| 11,278,011 B1 * | 3/2022 | Alcantar | C02F 1/32 |
| 2011/0180423 A1 | 7/2011 | Barry et al. | |
| 2021/0053841 A1 * | 2/2021 | Hofmann | C02F 1/722 |
| 2021/0227807 A1 | 7/2021 | Holm et al. | |

(Continued)

FOREIGN PATENT DOCUMENTS

| | | | |
|---|---|---|---|
| CA | 2441002 C | 6/2007 | |
| CN | 101492199 B * | 10/2012 | Y02W 10/37 |
| CN | 111747488 A | 10/2020 | |

(Continued)

OTHER PUBLICATIONS

Translation of Zhanchang (CN101492199B) (Year: 2003).*

(Continued)

*Primary Examiner* — Ekandra S. Miller-Cruz
(74) *Attorney, Agent, or Firm* — COATS & BENNETT, PLLC (57) ABSTRACT

A depuration process is employed for removing off-flavor contaminants from fish through an advanced oxidation process. Before the fish is harvested, the fish is transferred to a depuration tank or zone containing water. Off-flavor compounds leach from the tissue of the fish into the water in the depuration tank or zone. The water in the depuration tank or zone is circulated through an advanced oxidation reactor that, through an oxidation process, reduces the concentration of the off-flavor contaminants in the water.

6 Claims, 7 Drawing Sheets

(56) References Cited

U.S. PATENT DOCUMENTS

2021/0275604 A1   9/2021  Holm et al.
2021/0278378 A1   9/2021  Holm

FOREIGN PATENT DOCUMENTS

| CN | 112047493 A | 12/2020 |
| CN | 112111421 A | 12/2020 |
| CN | 113615606 A | 11/2021 |
| EP | 3426608 B1 | 5/2021 |
| JP | 2015019647 A | 2/2015 |
| KR | 20020050427 A | 6/2002 |
| WO | 2012087427 A1 | 6/2012 |
| WO | 2017153986 A1 | 9/2017 |
| WO | 2021150873 A1 | 7/2021 |
| WO | 2021216387 A1 | 10/2021 |

OTHER PUBLICATIONS

Zhao, W., et al., "Removal of Off-Flavor Compounds in Aquaculture Water by Spray-Coated TiO2 Photocatalysis", Journal of Chemical Engineering & Process Technology, Jul. 22, 2015, pp. 1-5, vol. 6, issue 3.

Azaria, S., et al., "Off-flavor compounds in recirculating aquaculture systems (RAS): Production and removal processes", Aquacultural Engineering, Elsevier B.V., Sep. 12, 2018, pp. 57-64, vol. 83.

Lawton, L., et al., "The destruction of 2-methylisoborneol and geosmin using titanium dioxide photocatalysis", Applied Catalysis B: Environmental, Elsevier B.V., Sep. 16, 2002, pp. 9-13, vol. 44.

Schrader, K., et al., "Evaluation of ozonation on levels of the off-flavor compounds geosmin and 2-methylisoborneol in water and rainbow trout *Oncorhynchus mykiss* from recirculation aquaculture systems", Aquacultural Engineering, Elsevier B.V., Jan. 29, 2010, pp. 46-50, vol. 43.

Davidson, J., et al., "Evaluation of depuration procedures to mitigate the off-flavor compounds geosmin and 2-methylisoborneol from Atlantic salmon *Salmo salar* raised to market-size in recirculating aquaculture systems", Aquacultural Engineering, Elsevier B.V., Jan. 3, 2014, pp. 27-34, vol. 61.

Lindholm-Lehto, P., et al., "Controlling of geosmin and 2-methylisoborneol induced off-flavours in recirculating aquaculture system farmed fish—A review", Aquaculture Research, Apr. 9, 2018, pp. 9-28.

Klausen, M., et al., "Pilot scale testing of advanced oxidation processes for degradation of geosmin and MIB in recirculated aquaculture", Water Science & Technology: Water Supply—WSTWS, Jan. 1, 2010, pp. 217-225.

Antonopoulou, M., et al., "A review on advanced oxidation processes for the removal of taste and odor compounds from aqueous media", Water Research, Elsevier B.V., Oct. 4, 2013, pp. 215-234, No. 53.

Cook, D., et al., "The Application of Powdered Activated Carbon for MIB and Geosmin Removal: Predicting PAC Doses in Four Raw Waters", Water Research, Elsevier Science Ltd., May 18, 2000, pp. 1325-1333, vol. 35, No. 5.

Bamuza-Pemu, E., et al., "Photocatalytic degradation of geosmin: Reaction pathway analysis", Water SA, Oct. 5, 2012, pp. 689-696, vol. 38, No. 5.

Chirwa, E., et al., "Investigation of Photocatalysis as an Alternative to Other Advanced Oxidation Processes for the Treatment of Filter Backwash Water", Water Research Commission, Mar. 1, 2010, pp. 1-90, Gezina, South Africa.

Walkerton Clean Water Centre, "Pilot Testing Project Report", Tay Area Water Treatment Plant, Sep. 3, 2019, pp. 1-31.

Schram, E., "Geosmin depuration from fish", PHD thesis, Wageningen University, Dec. 14, 2020, pp. 1-153.

Rodriguez-Gonzalez, L., et al., "Oxidation of off flavor compounds in recirculating aquaculture systems using UV-TiO2 photocatalysis", Aquaculture, Mar. 15, 2019, pp. 1-28, vol. 502.

Davidson, J., et al., "Depuration system flushing rate affects geosmin removal from market-size Atlantic salmon *Salmo Salar*", Aquaculture Engineering, Aug. 1, 2020, pp. 1-9, vol. 90.

\* cited by examiner

METHOD AND SYSTEM FOR PURGING OFF-FLAVOR COMPOUNDS FROM FARM-RAISED FISH

FIELD OF THE INVENTION

The present invention relates to systems and processes for raising aquatic organisms, and more particularly to systems and processes for purging off-flavor compounds from aquatic organisms.

BACKGROUND OF THE INVENTION

Over the last 50 years, fish farming has grown significantly in the United States and throughout the world. There are numerous reasons for this, including, for example, diminishing returns from the sea because of overfishing and the perceived sustainability of fish farming.

One of the challenges commonly encountered in fish farms and particularly in recirculating aquaculture systems (RAS) fish farming plants is the tendency of the fish to bioaccumulate unpalatable off-flavors that are unacceptable to consumers. Earthy and musty taints create negative consumer perception of fish-farmed products and often lead to economic losses for producers due to rejected filets and increased time, labor and capital cost all related to off-flavor remediation. These off-flavor compounds are primarily geosmin and 2-methylisoborneol (MIB).

There are many sources of these compounds in an operational fish farm, including contamination in incoming facility water, bacterial breakdown of uneaten food, bacterial breakdown of feces and other livestock by-products and tissues, biofouling of surfaces within the grow-out system, and bacterial action within the denitrification bioreactors.

These off-flavor compounds can be transported into and out of the tissue of farm-raised fish and, if not addressed, will eventually reach equilibrium with the surrounding water. A process known as depuration is employed to decrease the concentration of these off-flavor compounds in the water of a depuration zone or tank. One conventional way of reducing the concentration of off-flavor compounds in the fish is by continuously or intermittently diluting the water in the depuration zone or tank. There are many drawbacks and shortcomings to dilution approaches to reducing the concentration of off-flavor compounds in fish and other aquatic organisms. First, a huge amount of water is consumed. Secondly, this approach to purging off-flavor compounds in fish is lengthy and hence costly.

SUMMARY OF THE INVENTION

The present invention entails a depuration process for removing off-flavor contaminants from fish and other aquatic organisms through an advanced oxidation process.

In one embodiment, the present invention aims to reduce or minimize the consumption of water in the depuration process and to substantially reduce the depuration time compared to conventional depuration processes.

In one embodiment, a method of degrading and reducing the concentration of off-flavor contaminants, such as geosmin and 2-methylisobornel (MIB) compounds in fish and other aquatic organisms raised in recirculating aquacultural systems (RAS), is disclosed. After the fish or aquatic organisms have reached maturity and before harvesting, they are transferred from a grow out area in the RAS to a depuration zone or tank containing water. The water in the depuration zone or tank is continuously or at least intermittently circulated to and through an advanced oxidation reactor and back to the depuration zone or tank. A geosmin or MIB compound concentration gradient is maintained between the fish or aquatic organisms and the water in the depuration zone or tank. This is achieved by subjecting the water passing through the reactor to the advanced oxidation process that oxidizes and degrades the geosmin or MIB compounds in the water. This process effectively reduces the concentration of geosmin or MIB compounds in the water. In the course of maintaining this concentration gradient, a mass transfer of goesmin or MIB compounds from the tissue of the aquatic organisms to the water occurs.

In another embodiment of the present invention, the off-flavor compounds (such as geosmin or MIB) in the fish or aquatic organisms are oxidized through a photocatalytic or photoelectrocatalytic process. Here the water in the depuration zone or tank is pumped through a photocatalytic reactor that includes a UV light source and a titanium dioxide catalyst. As the water passes through the reactor, the UV light source irradiates the titanium dioxide catalyst, causing some electrons associated with the titanium dioxide catalyst to be displaced and effectively creating electron acceptors (positively charged electron holes) in the surface of the titanium dioxide catalyst. Two forms of oxidation occur, indirect and direct oxidation. Direct oxidation occurs as a result of the geosmin and MIB compounds contacting the titanium dioxide catalyst. The positively charged electron holes in the titanium dioxide catalyst pull electrons from the geosmin and MIB compounds, oxidizing and degrading them in the process. Indirect oxidation occurs through the electron acceptors in the surface of the titanium dioxide catalyst reacting with the water passing through the reactor to form hydroxyl radicals. These hydroxyl radicals oxidize and reduce the concentration of the geosmin and MIB compounds.

Other objects and advantages of the present invention will become apparent and obvious from a study of the following description and the accompanying drawings which are merely illustrative of invention.

DESCRIPTION OF EXEMPLARY EMBODIMENTS

Fish reared in recirculating aquaculture systems (RASs) can accumulate off-flavor organic compounds that have a deleterious effect on the flavor and odor profile of the produced meat. The two principal off-flavor compounds that are of concern are (1) geosmin and (2) 2-methylisoborneol (MIB). There are many sources of these compounds in an operational fish farm, including, for example: contamination in the incoming facility water, bacterial breakdown of uneaten food, bacterial breakdown of feces and other livestock by-products and tissues, biofouling of surfaces within the grow out system, and bacterial action within denitrification bioreactors that are typically found in RAS.

While there are known processes that attempt to reduce the concentration of these off-flavor compounds, they are, for the most part, inefficient. These processes consume large amounts of water, require extended periods of time to approach on-flavor conditions, and in the course of these processes the fish lose substantial biomass. All of these impact the marketability of the fish, the commercial viability of raising fish, and can reflect negatively on environmental concerns and the general welfare of the fish.

The present invention entails a depuration process that overcomes the drawbacks and shortcomings of conventional approaches. A primary goal of the present invention is to provide a depuration process that is efficient and designed to prevent or reduce deleterious effects on the fish. Further, the depuration process described here is designed to reduce the amount of time consumed by the depuration process. This obviously has a significant and directly measurable economic impact on fish farming operations, as well as in many cases significantly reducing the amount of water consumed. Practically, this means that the fish harvested are bigger because they have lost less weight due to the shortened depuration process, and the process has consumed approximately 60-90% less water per depuration. For many recirculating aquaculture farms, depuration is the dominant component of water consumption.

The depuration system and process described here is particularly applicable to fish raised in a RAS. Details of the RAS and the processes included therein are not dealt with here because such is not per se material to the present invention. However, for a more detailed understanding of the RAS technology, one is referred to U.S. Pat. No. 10,285,385, the disclosure of which is expressly incorporated herein by reference.

Once the fish in the RAS have reached maturity, they are transferred to a depuration tank or zone 12 filled with clean water. See FIG. 2. As used herein, the term "fish" means any aquatic organisms that are susceptible to being raised in a RAS. The depuration tank or zone 12 is typically disposed in the vicinity of the RAS but is isolated from the system of recirculating water used in the RAS. Once the fish have been transferred to the depuration tank or zone 12, the off-flavor compounds, geosmin and MIB, start to leach from the fish into the water in the depuration tank or zone 12. Hence, concentration of the geosmin and MIB in the water will start to increase. In order to efficiently reduce the concentration of geosmin and MIB in the fish, it is necessary to maintain a significant geosmin and MIB concentration gradient between the fish and the water in the depuration tank or zone. Thus, it is imperative to treat the water in the depuration tank so as to reduce the concentration of geosmin and MIB in the water contained in the tank.

Figure 2:
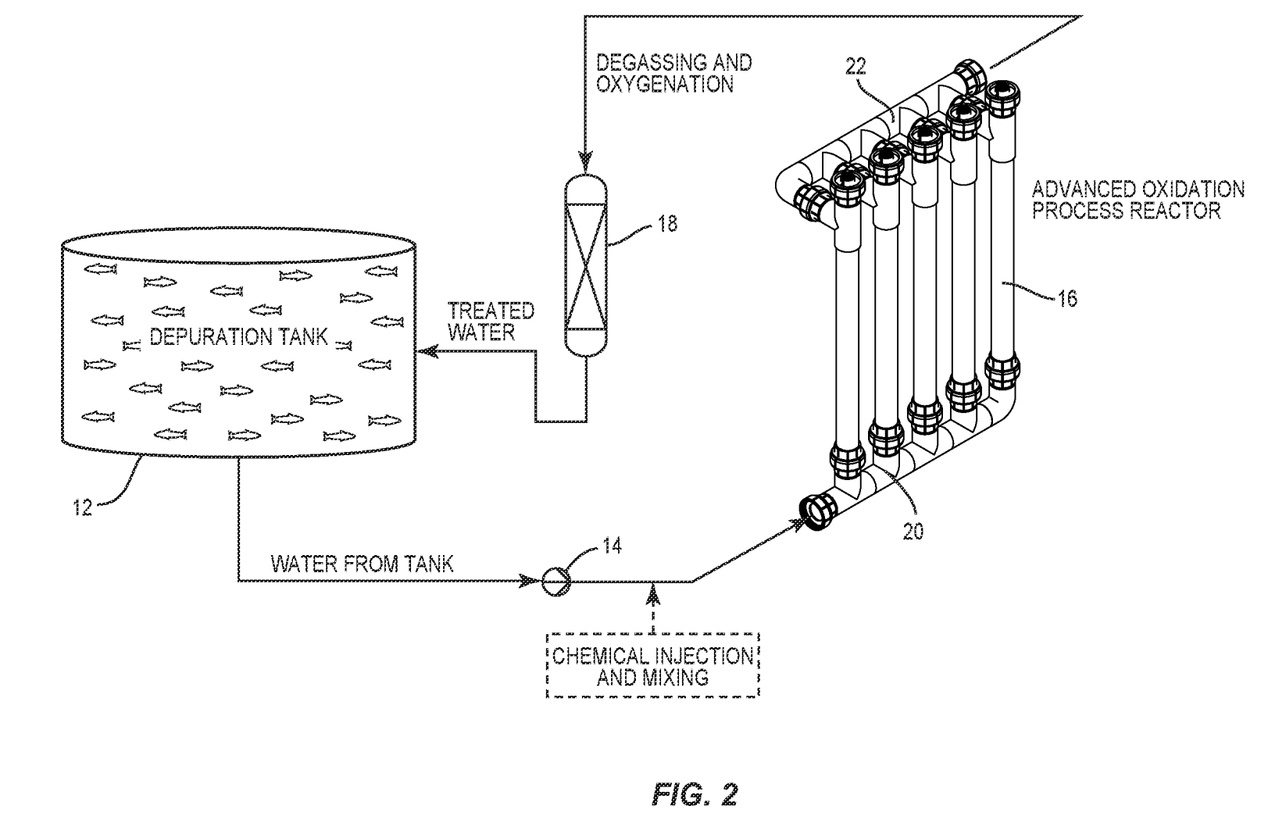
FIG. 2 illustrates an advanced oxidation system for removing off-flavor compounds from fish raised in a RAS.

Thus, the present invention entails a method or process for reducing the concentration of geosmin or MIB in the water in the depuration tank or zone. This process entails circulating water contained in the depuration tank or zone to a treatment unit designed to reduce the concentration of geosmin and MIB in the water. Hence, by circulating the water from the depuration tank or zone 12 through this treatment unit, the concentration of geosmin and MIB is reduced and, by continuously reducing the concentration of geosmin and MIB in the water, a significant geosmin and MIB concentration gradient is maintained between the fish and the water in the depuration tank or zone. Once a significant concentration gradient is established and maintained, a mass transfer of these off-flavor compounds leaches from the tissues of the fish at a rate proportional to the magnitude of the concentration gradient. The process of the present invention aims to continuously remove water from the depuration tank or zone, treat the water so as to reduce the concentration of geosmin and MIB, and recirculate essentially clean and pure water (essentially free of geosmin and MIB) continuously back into the depuration tank or zone. The depuration time required is shortest when the concentration gradient is highest. Hence, one of the objects of the present invention is to maintain a high geosmin and MIB concentration gradient between the water and the fish.

Figure 1:
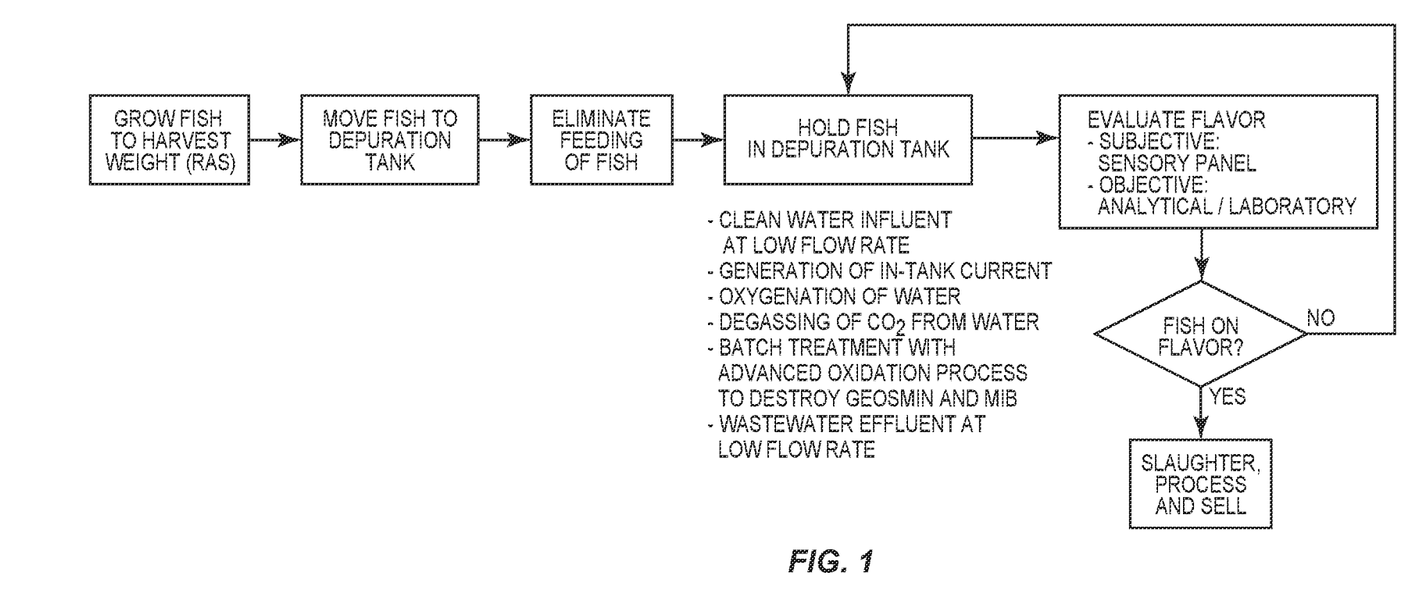
FIG. 1 is a flow chart describing basic steps or processes involved in purging off-flavor compounds from fish raised in a recirculating aquaculture system (RAS).

Fish are held in the depuration tank or zone 12 until the concentration of geosmin and MIB are below an established consumer sensory threshold. Once the concentration of geosmin and MIB are below this threshold, the fish are deemed "on-flavor". Various tests can be employed to determine when the fish in the depuration tank or zone have a sufficiently low concentration of geosmin or MIB to be deemed "on-flavor". In one example, a subjective test is performed on sample fish by one person or a panel of people at various times during the depuration process. This is referred to as a sensory panel. See FIG. 1. In addition, sample fish are removed from the depuration tank or zone at various times during the process and sent to an analytical lab that determines the concentration of geosmin and MIB found in the fish. Threshold concentrations can be set for various fish and circumstances. That is, once the concentration of geosmin or MIB found in the sample fish is below an established threshold, then, as noted above, the fish in the depuration tank are deemed to be "on-flavor". When this occurs, the fish are removed from the depuration tank or zone 12 and sent to a processing unit. On the other hand, if the tests indicate that the threshold concentration has not been met, the depuration process is continued and as the process continues, additional tests are periodically made.

With further reference to FIG. 2, one embodiment of the depuration system and process of the present invention is shown. The system includes a depuration tank 12, pump 14, one or more advanced oxidation reactors 16, and a degassing/oxygenation unit 18. In the depuration process, water including concentrations of geosmin and MIB is pumped from the tank 12 through the advanced oxidation reactors 16. In the exemplary embodiment shown in FIG. 2, a series of advanced oxidation reactors 16 are disposed in parallel relationship. As such, an inlet manifold 20 feeds the reactors 16 while an outlet manifold 22 receives the treated water from the reactors and directs the water back towards depuration tank 12. In the exemplary embodiment illustrated in FIG. 2, a degassing/oxygenation unit 18 is disposed in the return line from the reactors 16 to the depuration tank 12. The function of the degassing/oxygenation unit 18 is to degas the water passing there through by removing certain dissolved gases from the water. In particular, unit 18 is designed to remove carbon dioxide from the water being directed back to the depuration tank 12. In addition, since oxygen is required for the fish to survive, the degassing/oxygenation unit 18 is used to supply oxygen to the water being directed back into the depuration tank 12. It is not essential that the degassing/oxygenation unit 18 be incorporated into the system and process for reducing the concentration of geosmin and MIB from the water in the depuration tank 12. That is, the degassing/oxygenation unit 18 could be incorporated separately and apart from the process for reducing the concentration of geosmin and MIB from the water.

The present invention relies on advanced oxidation to reduce the concentration of geosmin and MIB organic compounds in the water such that a substantial geosmin and MIB concentration gradient is maintained between the water in the depuration tank 12 and the fish therein. Here, advanced oxidation entails generating and using hydroxyl free radicals (OH) as a strong oxidant that reduces the concentration of geosmin and MIB organic compounds. The hydroxyl radical reacts with dissolved geosmin and MIB, typically initiating a series of oxidation reactions until geosmin and MIB compounds are completely or nearly completely minimalized. Various forms of advanced oxidation processes can be used to reduce the concentration of geosmin and MIB in the water containing the fish. Examples of some advanced oxidation processes are as follows:

UV plus hydrogen peroxide;
UV plus hydrogen peroxide plus Fenton's reagent;
Ozone plus $UV_{254}$;
Ozone plus hydrogen peroxide;
Ozone plus $UV_{254}$ plus hydrogen peroxide;
Ozone plus titanium dioxide;
Ozone plus titanium dioxide plus hydrogen peroxide.

In one particular design, the advanced oxidation process used to reduce the concentration of geosmin and MIB is a photoelectrocatalytic reactor employing a titanium dioxide catalyst. This is particularly illustrated in FIGS. 3 and 4. As seen therein, the advanced oxidation reactor 16 comprises an elongated flow through tube having a water inlet on one end and a water outlet on the other end. Disposed in the reactor is a germicidal UV light source 24. A pair of electrodes 26, 28 are mounted in the reactor 16 between the UV light source 24 and the outer wall of the reactor 16. Electrode 26 is a photoactive anode coated with a titanium dioxide catalyst. Electrode 28, in this example, is a cathode. To increase the efficiency of the advanced oxidation process, a small positive electric potential is applied across the electrodes. When the titanium dioxide catalyst is illuminated with 254 nm germicidal ultraviolet light, electrons in the valence band of the titanium dioxide catalyst are excited into the conduction band and produce highly reactive electrons, and positively charged "electron holes" in the surface of the titanium dioxide catalyst which, as explained below, can directly oxidize the geosmin and MIB compounds that contact the surface of the titanium dioxide catalyst, as well as react with water to produce hydroxyl radicals that in turn indirectly oxidize the geosmin and MIB compounds.

Figure 3:
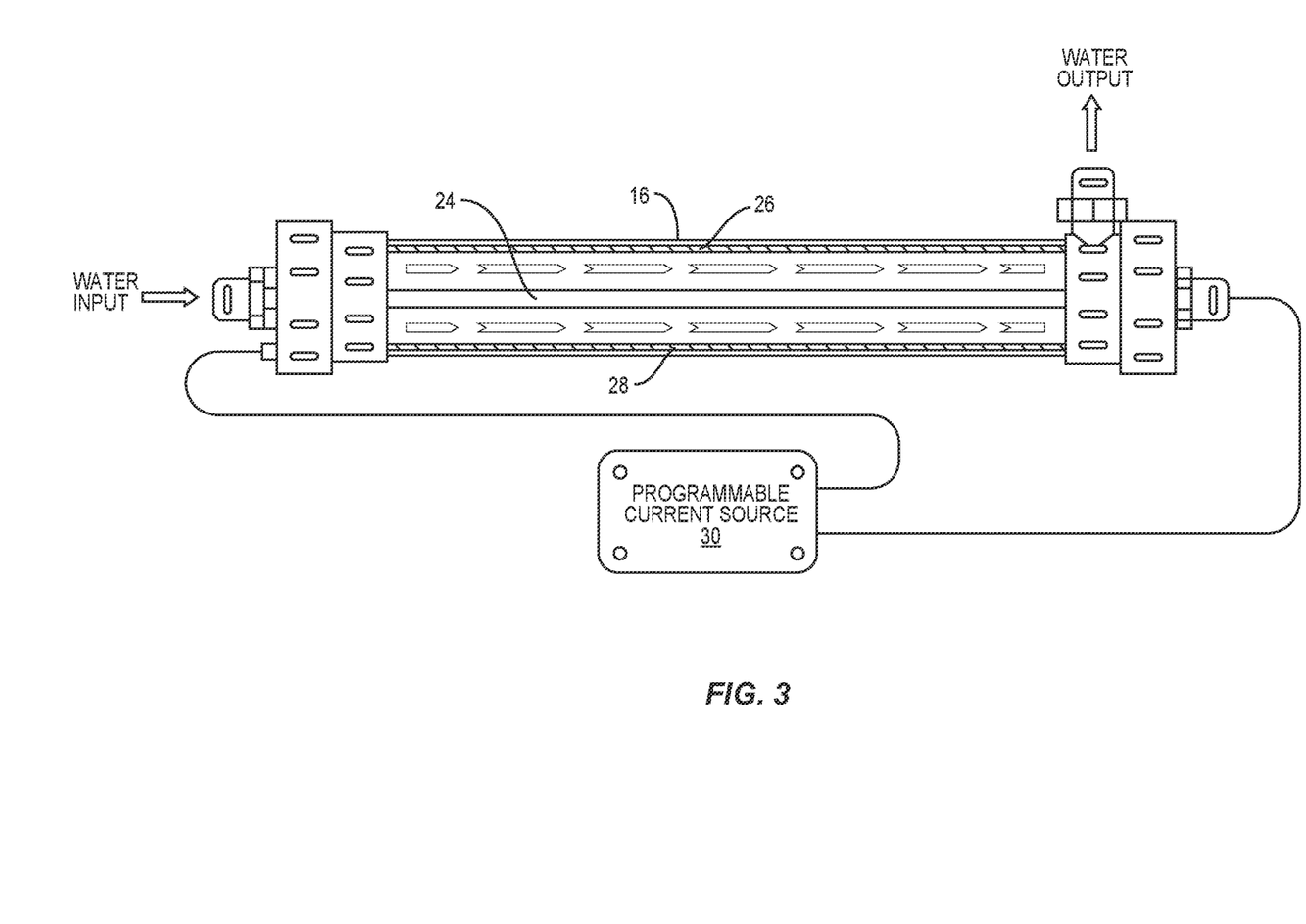
FIG. 3 illustrates a flowthrough advanced oxidation reactor utilized in one embodiment of the present invention which reduces the concentration of off-flavor compounds leached from fish.
Figure 4:
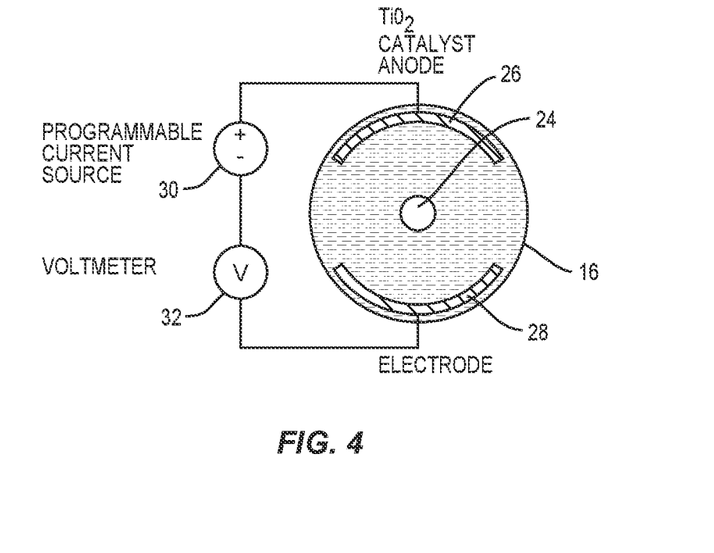
FIG. 4 is a cross-sectional view of the advanced oxidation reactor shown in FIG. 3 and illustrates a method of monitoring the operation of the advanced oxidation reactor.

Water containing geosmin and MIB organic compounds is pumped through the reactor 16 shown in FIG. 3. As the water containing geosmin and MIB compounds flows through the reactor 16, the geosmin and MIB compounds contact the titanium dioxide surface of the catalyst anode 26. When this happens, two types of reactions occur. One type of reaction results in the direct oxidation of geosmin and MIB. This is where the positively charged holes existing in the titanium dioxide catalyst pull electrons from the geosmin and MIB compounds. This breaks down these compounds through an oxidation process. Another type of reaction involves indirect oxidation. Indirect oxidation occurs when these positively charged electron holes in the catalyst pull electrons from the water and in turn produce hydroxyl radicals. These hydroxyl radicals are very powerful oxidizing species that are effective in oxidizing and reducing the concentration of geosmin and MIB in the water.

The performance of the advanced oxidation process in reactor 16 is efficient in reducing the concentration of geosmin and MIB in the water and has proven to achieve depuration in some applications in 5-6 days. Optionally, however, an oxidant, such as hydrogen peroxide, can be mixed with the water to enhance the advanced oxidation process. As seen in FIG. 2, the oxidant can be injected into the water just upstream of the reactors 16. In the alternative, the oxidant can be injected into the tank 12 and mixed with the water therein.

As alluded to above, the efficiency of the reactor 16 is enhanced by applying a small voltage across the electrodes 26, 28. This photoelectrocatalytic process increases the oxidation potential or capacity of the reactor and generally tends to reduce the tendency of the free electrons and positively charged "electron holes" to recombine. This is achieved by utilizing a programmable current source 30. See FIGS. 3 and 4. Note that the circuit includes the two electrodes 26, 28, the programmable constant current source 30 and a voltmeter. The programmable current source 30 applies a generally constant current. The current applied can vary depending on numerous factors such as the size of the reactor, etc. In one example, the applied current is in a range of 1-2 amps. By monitoring the volt meter, one can ascertain the effectiveness of the reactor 16. More particularly, when the voltage increases above an established threshold, this can indicate electrode fouling or that the electrodes, and particularly the titanium dioxide catalyst, require replacement.

Figure 5:
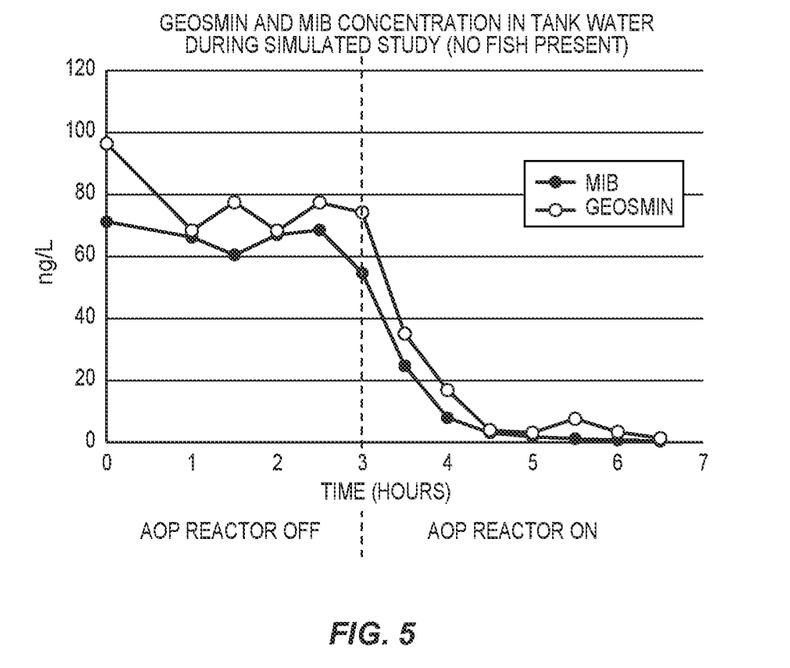
FIG. 5 is a graph of a study that illustrates the effectiveness of the advanced oxidation process of the present invention in reducing the concentration of off-flavor compounds (geosmin and MIB) from water.

A number of tests and studies have been conducted by the inventors to assess the effectiveness of the advanced oxidation process described above in reducing the concentration of geosmin and MIB in a depuration process. FIG. 5 represents a simulated study conducted without the presence of fish. Water contained in a tank was spiked with geosmin and MIB contaminants. Initially the concentration of geosmin was just under 100 ng/L (nanograms per Liter) while the concentration of MIB was approximately 70 ng/L. In the first three hours of the test, the advanced oxidation process (AOP) was turned off and the water was directed through an aeration pump and a low level of hydrogen peroxide was mixed with the water. At the three-hour point, the advanced oxidation or process described above was initiated. After the advanced oxidation process was initiated, the geosmin and MIB compounds were rapidly removed from the water and both contaminants fell to near the limit of detection within 1.5-2 hours.

Figure 6:
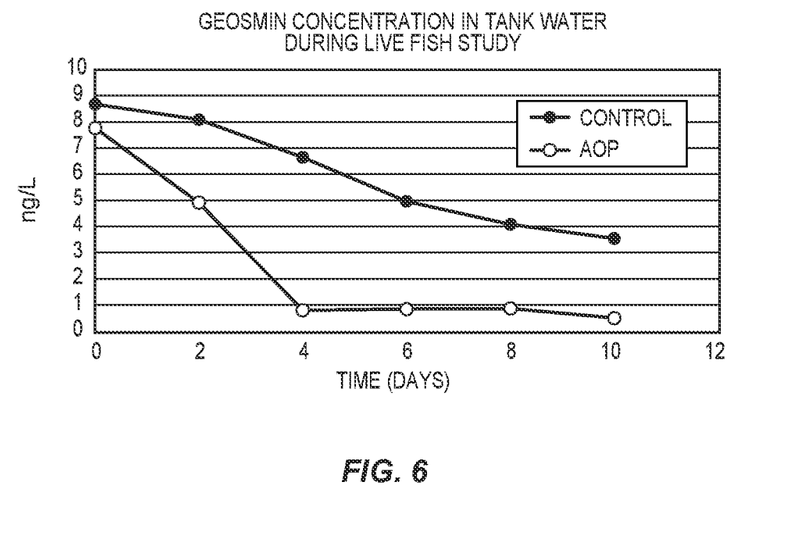
FIG. 6 is a live study illustrating the effectiveness of the advanced oxidation process of the present invention in reducing the concentration of off-flavor compounds from water in a depuration tank while fish are being actively depurated.

FIG. 6 represents a 10-day controlled study using live Atlantic salmon. In both the control and advanced oxidation tanks, the level of geosmin decreased over the 10-day period. In the control tank, geosmin levels declined at approximately 0.56 ng/L per day from approximately 9 ng/L to approximately 4 ng/L. In the advanced oxidation tank, geosmin levels fell to the limit of detection on day 4 and stayed low until the end of the experiment.

Figure 7:
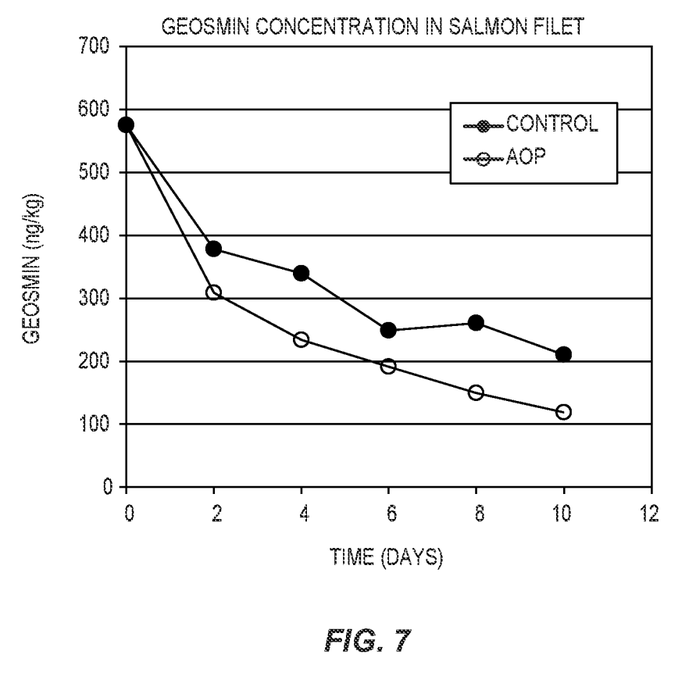
FIG. 7 is a live study illustrating the effectiveness of the advanced oxidation process of the present invention in reducing the concentration of off-flavor compounds in fish contained in a depuration tank.

FIG. 7 is another study representing a 10-day control experiment using live salmon. The study measured the concentration of geosmin in the flesh of the fish in both the control and advanced oxidation tanks. It is noted that the initial geosmin concentration in the flesh of the fish at the end of the main RAS grow out was 574.3+21.4 ng/kg (FIG. 7). Geosmin levels in the filets from the fish in both the control and the advanced oxidation tanks declined over the 10-day period. In this study, the geosmin removal rate in the advanced oxidation tank was approximately 60% faster than the removal rate in the control tank. Equally as important, the advanced oxidation process was able to reach the established acceptable geosmin concentration threshold (i.e., 200 ng/kg) in 4-5 days, while it took the salmon in the control tanks approximately 10 days to reach this threshold.

The present invention may, of course, be carried out in other specific ways than those herein set forth without departing from the scope and the essential characteristics of the invention. The present embodiments are therefore to be construed in all aspects as illustrative and not restrictive and all changes coming within the meaning and equivalency range of the appended claims are intended to be embraced therein.

What is claimed is:

1. A method of oxidizing geosmin or 2-methylisobornel (MIB) compounds in aquatic organisms raised in a recirculating aquaculture system (RAS), comprising:
   before harvesting the aquatic organisms, transferring the aquatic organisms from a grow-out area in the RAS to a depuration zone or tank containing water;
   ceasing to feed the aquatic organisms after the aquatic organisms have been transferred to the depuration zone or tank;
   circulating the water from the depuration zone or tank to a degassing and oxygenation unit and degassing the water and supplying oxygen to the water, after which the water is returned to the depuration zone or tank;
   circulating the water from the depuration zone or tank to and through a flowthrough reactor containing a UV light source, a first electrode having a titanium dioxide catalyst associated therewith and a second electrode, and back to the depuration zone or tank and in the process generating a water current in the depuration zone or tank;
   a. oxidizing and reducing the geosmin and MIB compounds in the water passing through the reactor by a photo electrocatalytic process comprising: irradiating the titanium dioxide catalyst with UV light emitted from the UV light source in the reactor, causing UV radiation to be absorbed by the titanium dioxide catalyst which creates negative charged free electrons and positively charged electron holes in the surface of the titanium dioxide catalyst;
   b. applying a voltage across the first and second electrodes;
   c. contacting the geosmin and MIB compounds flowing through the reactor with the titanium dioxide catalyst which results in the oxidation of the geosmin and MIB compounds due to the positively charged electron holes in the surface of the titanium dioxide catalyst pulling electrons from the geosmin and MIB compounds;
   d. reacting the positively charged electron holes with the water passing through the reactor to form hydroxyl radicals;
   e. reacting the hydroxyl radicals produced by the reactor with the geosmin and MIB compounds which reduces the concentration of the geosmin and MIB compounds in the water through an oxidation process;
   whereby by oxidizing the geosmin and MIB compounds in the water passing through the reactor, a geosmin or MIB concentration gradient is maintained between the aquatic organisms and the water in the depuration zone or tank, which in turn results in a mass transfer of geosmin or MIB from the tissue of the aquatic organisms into the water.

2. The method of claim 1 wherein there is provided a plurality of reactors disposed in parallel relationship through which water from the depuration zone or tank is circulated through.

3. The method of claim 1 wherein each reactor includes an elongated chamber having a water inlet on one end portion and a water outlet on the opposite end portion.

4. The method of claim 1 including mixing hydrogen peroxide with the water, resulting in the hydrogen peroxide reacting with UV light from the UV light source to form additional hydroxyl radicals.

5. The method of claim 1 further including injecting an oxidant into the water upstream of the reactor.

6. The method of claim 5 wherein the oxidant is taken from the group consisting of hydrogen peroxide, chlorine dioxide, ozone, and Fenton's reagents.

* * * * *